(No Model.)
F. P. STANLEY.
BICYCLE BRAKE.
No. 597,031. Patented Jan. 11, 1898.
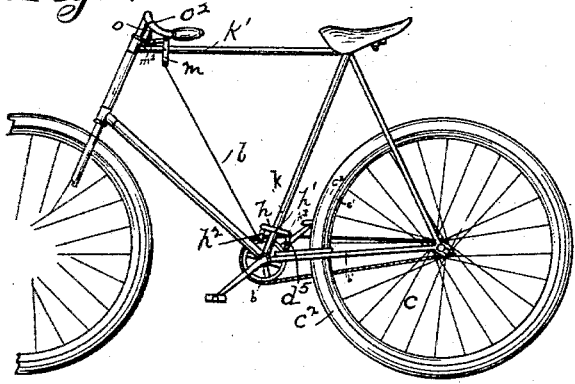
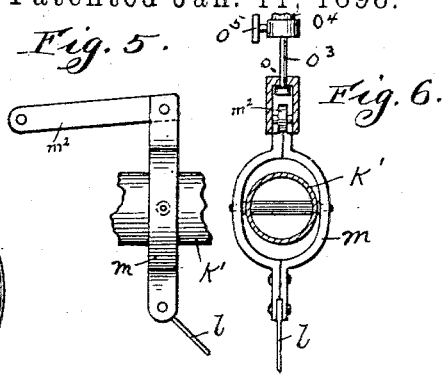
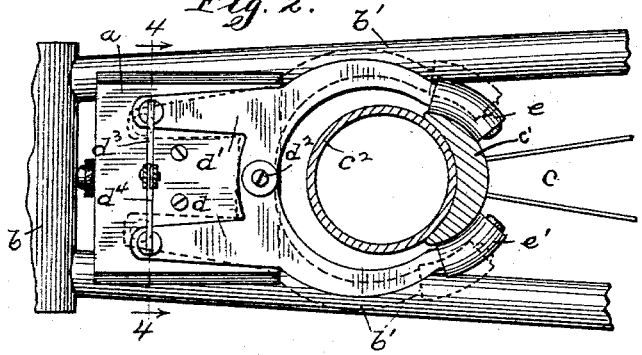
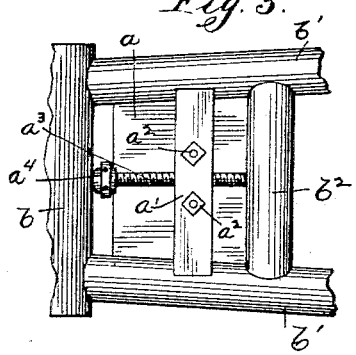
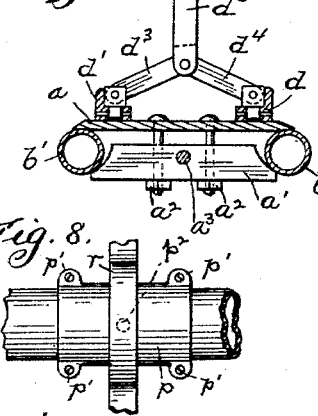
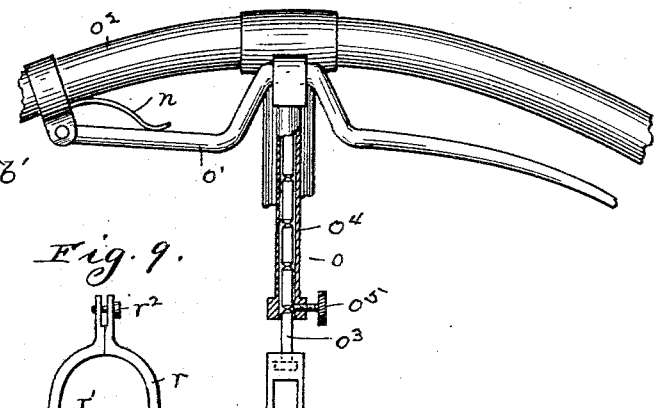
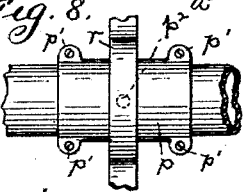
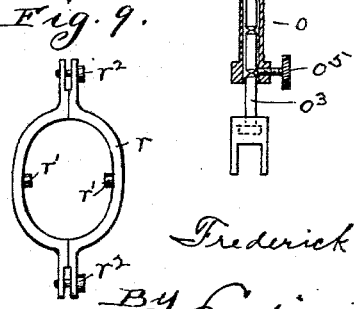
Witnesses:
W. J. Jaeker
M. R. Rochford
Inventor:
Frederick P. Stanley
By Ludington & Jones
Attys

UNITED STATES PATENT OFFICE.

FREDERICK P. STANLEY, OF CICERO, ILLINOIS, ASSIGNOR TO HOGAN D. COSBY, OF CHICAGO, ILLINOIS.

BICYCLE-BRAKE.

SPECIFICATION forming part of Letters Patent No. 597,031, dated January 11, 1898.

Application filed March 8, 1897. Serial No. 626,496. (No model.)

*To all whom it may concern:*

Be it known that I, FREDERICK P. STANLEY, a citizen of the United States, residing at Cicero, in the county of Cook and State of Illinois, have invented a certain new and useful Improvement in Bicycle-Brakes, of which the following is a full, clear, concise, and exact description, reference being had to the accompanying drawings, forming a part of this specification.

My invention relates to a brake more particularly adapted to bicycles, its object being to provide a brake which will effectively check the motion of the bicycle without acting upon the tire of the wheel.

In accordance with my invention in the preferred construction I provide a brake with two tire-encircling levers pivoted back of the crank-hanger of the frame and in front of the rear wheel and above the lower tubes of the bicycle-frame, with the braking ends adapted to be pressed against the rim of the rear wheel on both sides between the tire and the spokes, and with vertical links on the other end thereof connected with an operating-rod, in connection with suitable mechanism operated by a handle-lever on the steering-head, whereby in operating the brake the engagement of the links on the forward end of the brake-levers tends to counterbalance the downward pull of the wheel on the other (brake-shoe) ends of the brake-levers to produce thereby an effective, easily-operated, and reliable braking action.

In the accompanying drawings, Figure 1 is a view of a bicycle equipped with the brake of my invention. Fig. 2 is a plan view of the brake, showing the tire and the rim of the wheel in section. Fig. 3 is a view of the brake attachment from beneath. Fig. 4 is a sectional view on line 4 4, Fig. 3. Fig. 5 is a side view, and Fig. 6 an end view, of one of the collars of the brake-operating mechanism. Fig. 7 is a view of the handle for operating the brake. Figs. 8 and 9 are views of a modification in which a sleeve is attached to the bicycle-tube, to which the collar is pivoted.

Like letters refer to like parts in the several figures.

The plate $a$ of the brake attachment rests upon the rods $b'$ $b'$, extending from the barrel $b$ of the frame to the hub of the rear wheel $c$, which is secured in position by means of a block $a'$, which is clamped against the under sides of the rods $b'$ $b'$ by means of the bolts $a^2 a^2$. A screw $a^3$ passes through the block $a'$ and rests by one end against the barrel $b$ and by the other end against the cross-piece $b^2$ between the rods $b'$ $b'$. A head $a^4$ is provided on the screw, whereby it may be turned to move the plate $a$ back and forth to adjust the same in position and accommodate any change in the length of the driving-chain that may be made. Upon the plate $a$ are pivoted the brake-arms $b$ $b'$, adapted to rock upon the journal-pin $d^2$. To the ends of the arms are pivoted the links $d^3$ $d^4$, the opposite ends of which are pivoted to the operating-rod $d^5$. By depressing the rod $d^5$ the arms are thrust apart by the links to rock the brake-arms upon their pivot and bring the brake-shoes $e$ $e'$ into engagement with the rim $c'$ of the rear wheel $c$. The brake-shoes may consist of the ends of the arms $b$ $b'$ or may be separate blocks secured thereto, or, preferably, short tubes of rubber fitting over the ends of the arms and renewed from time time as they wear away. The arms $b$ $b'$ are curved, so as to fit about the tire $c^2$ without rubbing against the same. It oftentimes happens that the rear wheel does not run true, the rim being displaced to the right or the left of the position illustrated. The swiveling of the brake-arms upon the pivot $d^2$ permits the brake-arms to swing back and forth to engage the rim in any position it may occupy. The rod $d^5$ is pivoted at the upper end to permit the necessary lateral movement. The links connecting the ends of the brake-arms with the operating-rod constitute a toggle-joint whereby any force exerted upon the operating-rods imparts a greatly-magnified pressure to the brake-arms to press the ends apart and force the brake-shoes into contact with the rim. The friction of the rim upon the brake-shoes tends to force the ends of the brake-arms downward at one end, while the operating-rod forces the opposite ends downward, thus relieving the brake-arms of any tendency of being thrown out of position.

The upper end of the operating-rod $d^5$ is journaled to the collar $h$, surrounding the tube $k$ of the frame and pivoted thereto at $h'$, the pivots $h^3$ and $h'$ permitting a limited lateral movement of the rod $d^5$ to accommodate the swiveling of the brake-arms when the rim of the wheel is out of alinement. The opposite end of the collar carries an arm $h$, to which is attached a rod $l$, the opposite end of which is pivoted to the end of a similar collar $m$, surrounding and pivoted upon the tube $k'$ of the frame. The arm $n^2$ of this collar is connected with a rod $o$, attached at the upper end to the brake-handle $o'$, pivoted to the handle-bar $o^2$. The rod $o$ comprises a rod $o^3$, extending into a shell or tube $o^4$ and locked in any position therein by a set-screw $o^5$, whereby the length of the rod may be varied as the handle-bar is raised and lowered.

When it is desired to throw on the brake, the brake-handle is raised. The collar $m$ is thus rocked upon its pivot, and through the rod $l$ rocks the collar $h$ to depress the operating-rod $d^5$ and move the brake-shoes into engagement with the rim of the wheel. A spring $n$ may be provided for depressing the brake-handle to maintain the brake normally out of action.

When it is desired not to put holes in the tubes of the frame of the bicycle for the journal-pins upon which the collars are journaled, a sleeve $p$, Fig. 8, may be clamped about the tube by screws $p'$ $p'$, the sleeve carrying in the sides holes $p^2$ $p^2$, in which fit the lugs $r'$ $r'$, carried on the inner edges of the ring $r$, which is made in two halves adapted to be clamped together by screws $r^2$ $r^2$. The lugs $r'$ $r'$ act as journals upon which the ring may rotate.

Having described my invention, what I claim as new, and desire to secure by Letters Patent, is—

1. In a bicycle-brake, the combination with the lower tubes of the bicycle-frame, of a pair of horizontal tire-encircling brake-levers pivoted back of the crank-hanger and above the tubes and having the ends or brake-shoes arranged to be pressed upon the opposite sides between the tire and the spokes of the rear wheel, and a pair of vertically-extending links connected with an operating-lever and connected respectively to the forward ends of the brake-levers, whereby the thrust of the operating-rod and links is on the opposite side of the pivot and is in the same direction as is the pull of the wheel upon the brake-shoe ends of the brake-levers, substantially as described.

2. In a bicycle-brake the combination with the frame of the bicycle of a pair of horizontal tire-encircling brake-levers pivoted back of the crank-hanger and above the lower tubes and having the ends or brake-shoes arranged to be pressed upon the opposite sides between the tire and the spokes of the rear wheel, and a pair of vertically-extending links connected with an operating-lever and connected respectively to the forward ends of the brake-levers and a lever $h$ pivoted to the upright tubing $k$ the rear end of which lever engages the end of the operating-rod connected with the links, and the other end of which is connected by suitable operating mechanism with an operating-lever, substantially as described.

In witness whereof I have hereunto subscribed my name in the presence of two witnesses.

FREDERICK P. STANLEY.

Witnesses:
H. H. ROCKWELL,
M. A. ROCHFORD.